United States Patent
Huang et al.

(10) Patent No.: US 8,971,954 B2
(45) Date of Patent: Mar. 3, 2015

(54) MOBILE DEVICE

(71) Applicant: Altek Corporation, Hsinchu (TW)

(72) Inventors: Yu-Cheng Huang, Taichung (TW);
Tzu-Chih Lin, Hsinchu County (TW);
Wan-Chih Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 192 days.

(21) Appl. No.: 13/755,267

(22) Filed: Jan. 31, 2013

(65) Prior Publication Data
US 2014/0066123 A1    Mar. 6, 2014

(30) Foreign Application Priority Data
Sep. 5, 2012 (TW) .............................. 101132254 A

(51) Int. Cl.
*H04W 88/02* (2009.01)
*H04M 1/02* (2006.01)
*H04M 19/04* (2006.01)

(52) U.S. Cl.
CPC ............ *H04M 1/026* (2013.01); *H04M 19/047* (2013.01)
USPC ...................................................... 455/550.1

(58) Field of Classification Search
USPC ..................................................... 455/550.1
See application file for complete search history.

(56) References Cited

U.S. PATENT DOCUMENTS

| 2010/0327687 A1 | 12/2010 | Iannello et al. | |
|---|---|---|---|
| 2013/0201316 A1* | 8/2013 | Binder et al. | 348/77 |
| 2014/0234949 A1* | 8/2014 | Wasson et al. | 435/287.2 |

FOREIGN PATENT DOCUMENTS

| CN | 101892996 A | 11/2010 |
|---|---|---|
| TW | M310268 | 4/2007 |
| TW | M431089 U1 | 6/2012 |

OTHER PUBLICATIONS

Taiwanese Office Action in corresponding Application No. 101132254, dated Oct. 6, 2014.

* cited by examiner

*Primary Examiner* — Diane Mizrahi
(74) *Attorney, Agent, or Firm* — Bacon & Thomas, PLLC

(57) ABSTRACT

The present invention discloses a mobile device including a motor module, a heat dissipation module, a vibration module and an electric brush module. The motor module has a rotating shaft driven by the motor module and two ends of which stick out from the motor module. The heat dissipation module includes a fan unit fixed on one end of the rotating shaft. The vibration module includes a vibration cam and an electromagnetic coil disposed on the vibration cam. The vibration cam is loosely fitted and disposed on the other end of the rotating shaft. The electric brush module is disposed inside the mobile device corresponding to the electromagnetic coil. When electrified, the electric brush module excites the electromagnetic coil generating a magnetic force to adhere and rotate with the rotating shaft synchronously. Herewith the effects of effective heat dissipation and saving interior space of the mobile device are achieved.

18 Claims, 4 Drawing Sheets

MOBILE DEVICE

CROSS-REFERENCE TO RELATED APPLICATION

This application claims the benefit of Taiwan Patent Application No. 101132254, filed on Sep. 5, 2012, in the Taiwan Intellectual Property Office, the disclosure of which is incorporated herein in its entirety by reference.

BACKGROUND OF THE INVENTION

1. Field of the Invention

The present invention relates to a mobile device, and more particularly to the mobile device having a heat dissipation module and a vibration module and capable of sharing a motor module.

2. Description of Related Art

As science and technology advance, mobile devices such as mobile phones have become the necessary communication and recreational tools for our life. However, after a long time of use, the mobile phone accumulates heat inside and may damage internal components of the mobile phone, so that heat dissipation is an important issue.

At present, most of the mobile phones dissipate heat by conducting the heat to a casing of the mobile phone. However, the heat dissipation by conducting the heat to the casing of the mobile phone may heat up the casing of the phone after a long time of use of the phone. In other words, such heat dissipation method may cause discomfort or even burns to users.

On the other hand, if a heat dissipation module is disposed inside the mobile phone, an additional motor will be required for driving the heat dissipation system, and thus increasing the installation space required for internal components significantly. In addition, present mobile phones tend to be developed with a thin and thin design, and it is difficult to install an additional motor in the limited space of the mobile phone for driving the heat dissipation system. The additionally disposed heat dissipation system will increase the volume of the mobile phone, and thus failing to comply with the user requirements. Therefore, the way for mobile devices to dissipate heat is limited significantly, and this is one of the major problems that demand a feasible solution.

In summation of the description above, the inventor of the present invention based on years of experience in the related industry to conduct researches and experiments, and finally designed a mobile device to overcome the aforementioned problems of the prior art and enhance the industrial application.

SUMMARY OF THE INVENTION

Therefore, it is a primary objective of the invention to overcome the aforementioned problems of the prior art by providing a mobile device in hope of solving the poor heat dissipation problem of the conventional mobile device.

To achieve the foregoing objective, the present invention provides a mobile device, comprising a motor module, a heat dissipation module, a vibration module and an electric brush module. The motor module comprises a rotating shaft, and both ends of the rotating shaft are exposed from both ends of the motor module respectively, and the motor module is provided for driving a rotating shaft to rotate. The heat dissipation module comprises a fan unit mounted at an end of the rotating shaft. The vibration module comprises an electromagnetic coil and a vibration cam, wherein the electromagnetic coil is loosely fitted and disposed on a lateral side of the vibration cam, and the vibration cam is disposed at the other end of the rotating shaft. The electric brush module is disposed inside the mobile device and at a position corresponding to the electromagnetic coil, such that when the electric brush module is electrically conducted, the electric brush module excites the electromagnetic coil to produce a magnetic force in order to attach onto the rotating shaft, and synchronously drive the rotating shaft to rotate.

Preferably, the mobile device further comprises a driving detection module for generating a driving signal to drive the motor module when the driving detection module detects an electric conduction of the electric brush module or the temperature inside the mobile device being greater than a predetermined value.

Preferably, the mobile device further comprises a power detection module for generating a power signal when the power detection module detects that the electric power of the mobile device is smaller than a predetermined value, and when the driving detection module receives the power signal, the driving detection module generates the driving signal only if the electric brush module is detected to be electrically conducted.

Preferably, the heat dissipation module further comprises a fan casing disposed in the mobile device and at a position corresponding to the fan unit for covering the fan unit, and the fan casing includes at least one opening formed on a lateral side of the fan casing.

Preferably, the mobile device further comprises a sound-absorbing layer disposed on an internal surface or an external surface of the fan casing and made of a material selected from the collection of glass wool, rock wool or a combination thereof.

In summation of the description above, the mobile device of the present invention has one or more of the following advantages:

(1) In the mobile device of the present invention, the heat dissipation module and the vibration module share the same motor module to save installation space and cost effectively.

(2) The mobile device of the present invention can overcome the problem of having a poor heat dissipation effect of the conventional mobile device that may cause discomfort or even burn the users.

DETAILED DESCRIPTION OF THE PREFERRED EMBODIMENTS

The technical contents and characteristics of the present invention will be apparent with the detailed description of a preferred embodiment accompanied with related drawings as follows. Wherein, a mobile phone is used as an example of the mobile device to illustrate the present invention, but the invention is not limited to the scope of mobile phones only.

Figure 1:
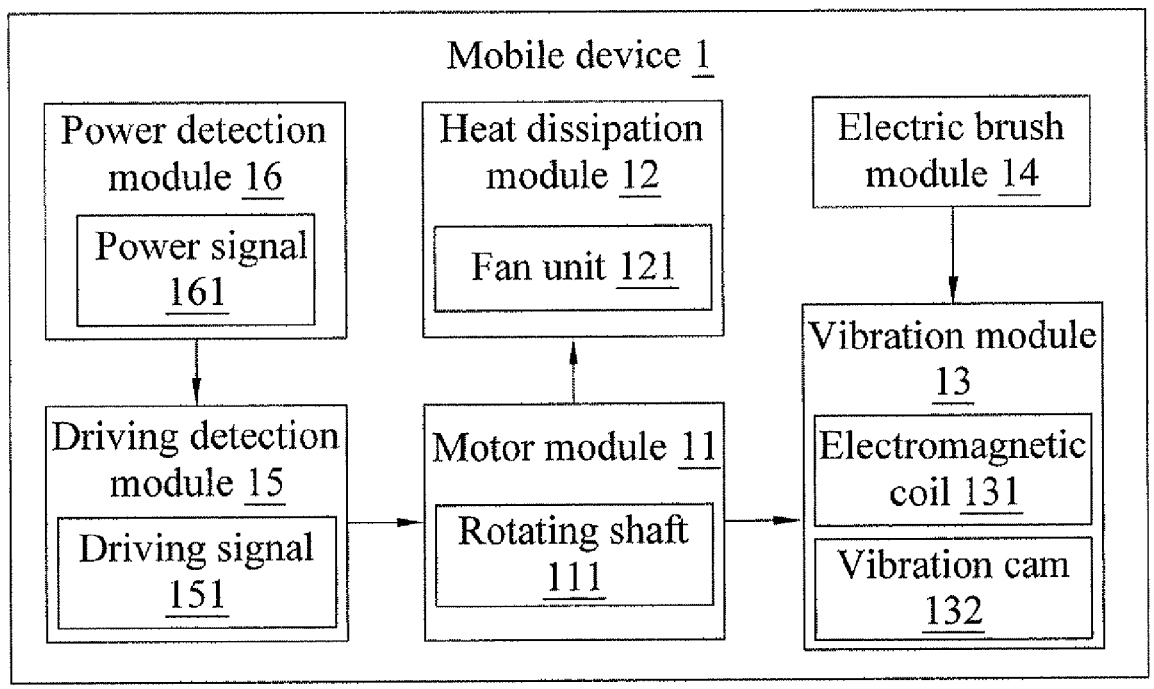
FIG. 1 is a block diagram of a mobile device in accordance with a preferred embodiment of the present invention.
Figure 2:
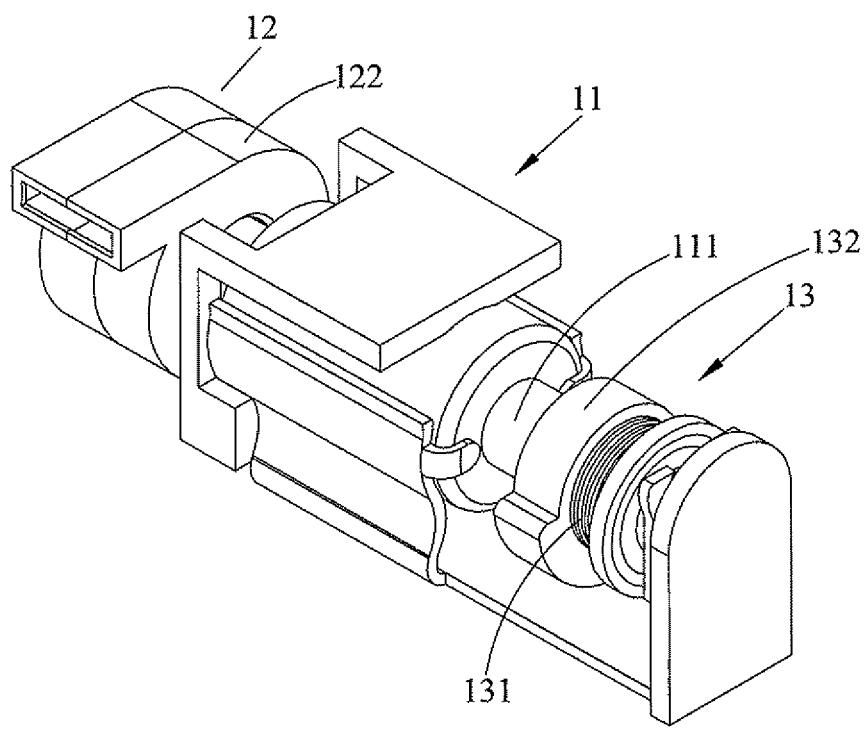
FIG. 2 is a schematic view of a mobile device in accordance with a preferred embodiment of the present invention.
Figure 3:
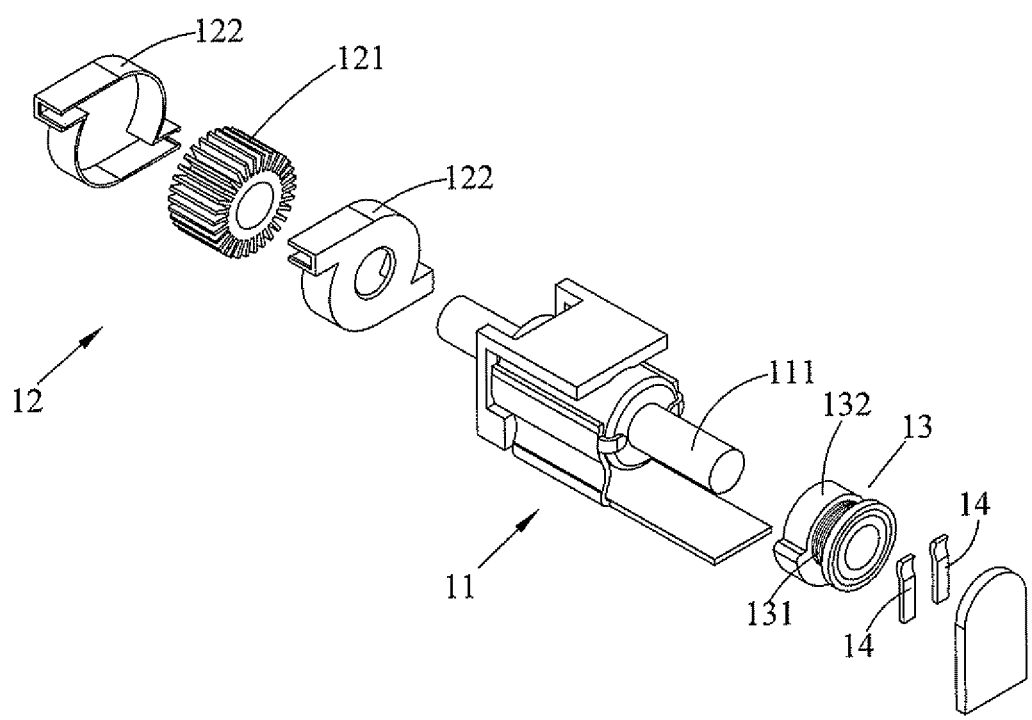
FIG. 3 is an exploded view of a mobile device in accordance with a preferred embodiment of the present invention.

With reference to FIGS. 1, 2 and 3 for a block diagram, a schematic view, and an exploded view of a mobile phone in accordance with a preferred embodiment of the present invention respectively, the mobile phone 1 as shown in FIG. 1 comprises a motor module 11, a heat dissipation module 12, a vibration module 13, an electric brush module 14, a driving detection module 15 and a power detection module 16. Wherein, the motor module 11 is disposed in the mobile device 1 and includes a rotating shaft 111, and both ends of the rotating shaft 111 are exposed from both ends of the motor module 11 respectively, and the motor module 11 drives the rotating shaft 111 to rotate. The heat dissipation module 12 is disposed in the mobile device 1 and includes a fan unit 121 mounted at an end of the rotating shaft 111. The vibration module 13 is disposed in the mobile device 1 and includes an electromagnetic coil 131 and a vibration cam 132. The electromagnetic coil 131 is disposed on a lateral side of the vibration cam 132, and with respect to the fan unit 121, the vibration cam 132 is loosely fitted and disposed at the other end of the rotating shaft 111. The electric brush module 14 is disposed in the mobile device 1 and at a position corresponding to the electromagnetic coil 131. When the electric brush module 14 is electrically conducted, the electric brush module 14 excites the electromagnetic coil 131 to produce a magnetic force for attaching the electromagnetic coil 131 to the rotating shaft 111. When the rotating shaft 111 rotates, the vibration cam 132 can synchronously rotate with the rotating shaft 111.

The mobile device 1 further comprises a driving detection module 15 and a power detection module 16. The driving detection module 15 produce a driving signal 151 to drive the motor module 11 when the electric brush module 14 is electrically conducted or the temperature of the mobile device 1 is greater than a predetermined value. When the power detection module 16 detects that the electric power of the mobile device 1 is smaller than a predetermined value, the mobile device 1 generates a power signal 161. When the driving detection module 15 receives the power signal 161, the driving detection module 15 will not generate the driving signal 151 even the temperature is greater than the predetermined value. The driving signal 151 will be generated only if an electric conduction of the electric brush module 14 is detected.

It is noteworthy that the heat dissipation module 12 further comprises a fan casing 122 disposed in the mobile device 1 and at a position corresponding to the fan unit 121 for covering the fan unit 121, and the fan casing 122 includes at least one opening formed on a lateral side of the fan casing 122. Since the sound produced during the rotation of the fan unit 121 may bother users, a sound-absorbing layer can be disposed on an internal surface or an external surface of the fan casing 122, wherein the sound-absorbing layer is made of glass wool, rock wool or a combination thereof. Therefore, when the fan unit 121 is rotated, the sound generated from the rotation of the fan unit 121 can be absorbed by the sound-absorbing layer to prevent the noise annoying the users.

FIGS. 2 and 3 have not shown the driving detection module 15 and the power detection module 16. In FIGS. 2 and 3, the heat dissipation module 12 and the vibration module 13 have a driving force coming from the rotation of the rotating shaft 111 of the motor module 11. In other words, the heat dissipation module 12 and the vibration module 13 can share the same motor module 11 for the driving effect through the rotating shaft 111 without requiring two motors to drive the heat dissipation module 12 and the vibration module 13 respectively, so as to save the installation space significantly.

In FIG. 1, when the driving detection module 15 detects that the temperature inside the mobile device 1 is greater than a predetermined value, a driving signal 151 is generated to drive the motor module 11. Now, the rotating shaft 111 of the motor module 11 is rotated to drive the fan unit 121 of the heat dissipation module 12 to rotate, so as to achieve the heat dissipation effect. Now, the vibration cam 132 of the vibration module 13 is loosely fitted and disposed at the other end of the rotating shaft 111, so the rotation of the rotating shaft 111 will not drive the vibration cam 132 to rotate.

When the mobile device 1 has an incoming call, the electric brush module 14 is electrically conducted to excite the electromagnetic coil 131 of the vibration module 13, such that the electromagnetic coil 131 produces a magnetic force to attach to the rotating shaft 111. In the meantime, the driving detection module 15 detects the electric conduction of the electric brush module 14 and generates the driving signal 151 to drive the motor module 11. Now, the rotating shaft 111 of the motor module 11 is rotated to drive the vibration cam 132 to rotate, so as to achieve the incoming call vibration effect. In addition, the rotation of the rotating shaft 111 also drives the fan unit 121 of the heat dissipation module 12 to rotate, so as to achieve the heat dissipation effect.

In other words, when the mobile device 1 has no incoming call, and the temperature inside the mobile device 1 is greater than a predetermined value, the driving detection module 15 can drive the rotating shaft 111 to rotate based on the driving signal 151 to drive the fan unit 121 of the heat dissipation module 12 to rotate, so as to achieve the heat dissipation effect. Now, the electric brush module 14 is not electrically conducted, the rotation of the rotating shaft 111 will not drive the vibration cam 132 to rotate and cause an incoming call vibration. When the mobile device 1 has an incoming call, the electric brush module 14 is electrically conducted, so that the electromagnetic coil 131 is excited to attach the vibration cam 132 to the rotating shaft 111, and the rotation of the rotating shaft 111 can drive the vibration cam 132 and the fan unit 121 simultaneously to achieve the incoming call vibration effect as well as the heat dissipation effect.

In other words, when the temperature inside the mobile device 1 is too high, the fan unit 121 will be rotated to dissipate the heat, and the vibration cam 132 will not be driven to rotate and cause a misjudgment of the incoming call vibration during the heat dissipation process. When the mobile device 1 has an incoming call, the vibration cam 132 is rotated to achieve the incoming call vibration effect, while the fan unit 121 is also being rotated to achieve the heat dissipation effect.

On the other hand, the power detection module 16 can detect the level of electric power of the mobile device 1. If the electric power of the mobile device 1 is smaller than a predetermined value, a power signal 161 will be generated. When the driving detection module 15 receives the power signal 161, even if the detected temperature of the mobile device 1 is greater than the predetermined value, the driving signal 151 will not be generated. The driving signal 151 will be generated, only if the electric conduction of the electric brush module 14 is detected.

Further, when the electric power of the mobile device 1 is smaller than predetermined value, even if the temperature of the mobile device 1 is greater than the predetermined value, the driving detection module 15 will not drive the rotating shaft 111 of the motor module 11 to rotate so as to drive the heat dissipation module 12 and the vibration module 13. When the mobile device 1 has an incoming call, the driving detection module 15 generates the driving signal 151 to drive the rotating shaft 111 of the motor module 11 to rotate, while the electric brush module 14 is electrically conducted to drive the heat dissipation module 12 and the vibration module 13, so as to achieve the heat dissipation effect in the incoming call vibration process.

In other words, when the electric power of the mobile device 1 is insufficient, the mobile device 1 adopts the conventional heat dissipation method, that is, conducting the heat energy to the casing of the mobile device 1 for the heat dissipation, so as to prevent driving the heat dissipation module 12 from consuming too much electric power. However, when the mobile device 1 has an incoming call, the incoming call vibration function will be provided to remind the users. Now, the motor module 11 is driven to drive the vibration module 13, and the heat dissipation module 12 is also driven during the incoming call vibration process, thus further improving the heat dissipation effect without consuming additional electric power.

In summation, when the electric power of the mobile device 1 is sufficient, and the temperature inside the mobile device 1 is too high, the rotating shaft 111 of the motor module 11 is rotated to drive the fan unit 121 of the heat dissipation module 12, and the rotation of the rotating shaft 111 will not drive the vibration cam 132 of the vibration module 13, so that when the heat generated by the mobile device 1 is dissipated, the mobile device 1 will not be vibrated to disturb the user. When the mobile device 1 has an incoming call, the electric brush module 14 will be electrically conducted to excite the electromagnetic coil 131 of the vibration module 13, so that the vibration cam 132 can be attached onto the rotating shaft 111. The rotation of the rotating shaft 111 drives the fan unit 121 and the vibration cam 132 to achieve the heat dissipation effect during the incoming call vibration process. When the electric power of the mobile device 1 is insufficient, both vibration cam 132 and fan unit 121 will be driven only if the mobile device 1 has an incoming call and requires the incoming call vibration function. When the mobile device 1 has no incoming call, the fan unit 121 will not be driven to save power even if the internal temperature is not too high.

With reference to Table 1 for a table of driving conditions of a mobile device in accordance with a preferred embodiment of the present invention, the conditions such as whether or not the power signal 161 is generated, the electric brush module 14 is electrically conducted, and the temperature is too high can be divided into a first condition C1, a second condition C2, a third condition C3, a fourth condition C4, a fifth condition C5, a sixth condition C6, a seventh condition C7 and an eighth condition C8. Based on these eight conditions, the motor module 11 can be driven or not driven, and the vibration cam 132 and the fan unit 121 can be driven or not driven respectively. It is noteworthy to notice the second condition C2, the third condition C3 and the fourth condition C4. The condition whether or not the electric brush module 14 is electrically conducted to excite the electromagnetic coil 131 can be used to achieve the effect of using a single motor module 11 to drive the vibration cam 132 and the fan unit 121 simultaneously or to drive them at different time. The remaining first condition C1, fifth condition C5, sixth condition C6, seventh condition C7 and eighth condition C8 have been described above, and will not be repeated.

TABLE 1

| | Power signal 161 (Insufficient power) | Brush module 14 is electrically conducted (Incoming call) | Temperature is too high | Motor module 11 | Vibration cam 132 | Fan unit 121 |
|---|---|---|---|---|---|---|
| First condition C1 | 0 | 0 | 0 | 0 | 0 | 0 |
| Second condition C2 | 0 | 0 | 1 | 1 | 0 | 1 |
| Third condition C3 | 0 | 1 | 0 | 1 | 1 | 1 |
| Fourth condition C4 | 0 | 1 | 1 | 1 | 1 | 1 |
| Fifth condition C5 | 1 | 0 | 0 | 0 | 0 | 0 |
| Sixth condition C6 | 1 | 0 | 1 | 0 | 0 | 0 |
| Seventh condition C7 | 1 | 1 | 0 | 1 | 1 | 1 |
| Eighth condition C8 | 1 | 1 | 1 | 1 | 1 | 1 |

Figure 4:
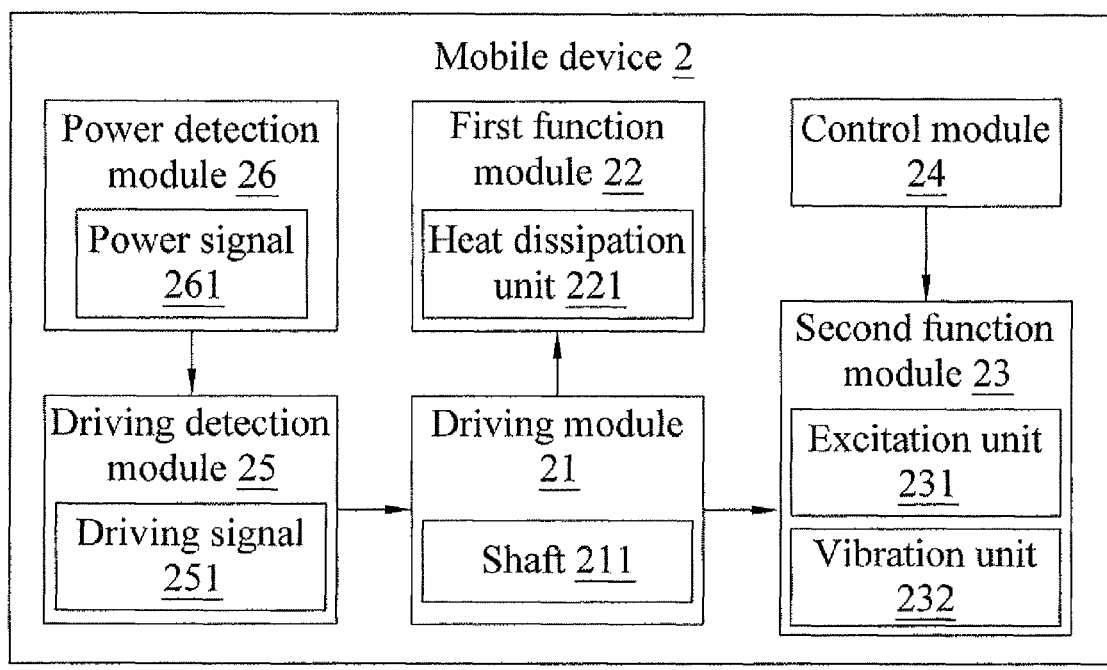
FIG. 4 is a block diagram of a mobile device in accordance with another preferred embodiment of the present invention.

With reference to FIG. 4 for a block diagram of a mobile phone in accordance with another preferred embodiment of the present invention, the present invention further provides another mobile device 2, comprising a driving module 21, a first function module 22, a second function module 23, a control module 24, a driving detection module 25 and a power detection module 26. The driving module 21 is disposed in the mobile device 1 and has a shaft 211, both ends of the shaft 211 are exposed from both ends of the driving module 21 respectively, and the driving module 21 drives the shaft 211 to rotate. The first function module 22 is disposed in the mobile device 2 and includes a heat dissipation unit 221 mounted to an end of the shaft 211. The second function module 23 is disposed in the mobile device 2 and includes an excitation unit 231 and a vibration unit 232. The excitation unit 231 is disposed on a lateral side of the vibration unit 232, and the vibration unit 232 is loosely fit and disposed at the other side of the shaft 211. The control module 24 is disposed in the mobile device 2 and at a position corresponding to the excitation unit 231. When the control module 24 is electrically conducted, the control module 24 excites the excitation unit 231 to produce a magnetic force to attach onto the shaft 211 and synchronously rotate with the shaft 211.

The control module 24 is adjusted to be electrically conducted or not, so as to excite the excitation unit 231 to attach onto the shaft 211, which can control whether or not both of the first function module 22 and the second function module 23 are driven synchronously, when the shaft 211 rotates.

The mobile device 2 further comprises a driving detection module 25 and a power detection module 26. The driving detection module 125 detects that the control module 24 is electrically conducted or the temperature inside the mobile device 2 is greater than a predetermined value, then a driving signal 251 will be generated to drive the driving module 21. The power detection module 26 detects that the electric power of the mobile device 2 is smaller than a predetermined value, and then the power signal 261 is generated. When the driving detection module 25 receives the power signal 261, the driving signal 252 is generated only if the control module 24 is detected to be electrically conducted, so as to save electric power.

It is noteworthy that the first function module 22 can further include a casing 122 disposed in the mobile device 2 and at a position corresponding to the heat dissipation unit 221 for covering the heat dissipation unit 221, and the casing 122 includes at least one opening formed on a lateral side of the casing 122. In addition, a sound-absorbing unit can be disposed on an internal surface or an external surface of the casing 122, wherein the sound-absorbing layer is made of glass wool, rock wool or a combination thereof. When the heat dissipation unit 221 is rotated, the sound produced by the heat dissipation unit 221 can be absorbed by the sound-absorbing layer to prevent noises from annoying the users.

The implementation of the mobile device 2 of the present invention is substantially the same as that of the mobile device 1 of the present invention as described above, and thus will not be repeated.

What is claimed is:

1. A mobile device, comprising:
   a motor module, disposed in the mobile device, and having a rotating shaft with both ends exposed from both ends of the motor module respectively, for driving the rotating shaft to rotate;
   a heat dissipation module, disposed in the mobile device, and including a fan unit mounted to an end of the rotating shaft;
   a vibration module, disposed in the mobile device, and including an electromagnetic coil and a vibration cam, the electromagnetic coil being disposed on a lateral side of the vibration cam, and the vibration cam being loosely fitted and disposed at the other end of the rotating shaft; and
   an electric brush module, disposed in the mobile device and at a position corresponding to the electromagnetic coil;
   wherein when the electric brush module is electrically conducted, the electric brush module excites the electromagnetic coil to produce a magnetic force to attach onto the rotating shaft, and synchronously rotate with the rotating shaft.

2. The mobile device of claim 1, further comprising a driving detection module, wherein when the driving detection module detects an electric conduction of the electric brush module or the temperature inside the mobile device being greater than a predetermined value, the driving detection module generates a driving signal to drive the motor module.

3. The mobile device of claim 2, further comprising a power power detection module, wherein when the power detection module detects that the electric power of the mobile device is smaller than a predetermined value, the power detection module generates a power signal to the driving detection module, and when the driving detection module receives the power signal, detects the electric conduction of of the electric brush module, and detects the temperature inside the mobile device greater than the predetermined value, the driving detection module generates the driving signal to drive the motor module.

4. The mobile device of claim 1, wherein the heat dissipation module further comprises a fan casing disposed in the mobile device and at a position corresponding to the fan unit for covering the fan unit, and the fan casing includes at least one opening formed on a lateral side of the fan casing.

5. The mobile device of claim 4, further comprising a sound-absorbing layer disposed on an internal surface or an external surface of the fan casing and made of a material selected from the collection of glass wool, rock wool or a combination thereof.

6. A mobile device, comprising:
   a driving module, disposed in the mobile device, and having a shaft, and both ends of the shaft being exposed from both ends of the driving module respectively, and the driving module driving the shaft to rotate;
   a first function module, disposed in the mobile device, and including a heat dissipation unit mounted at an end of the shaft;
   a second function module, disposed in the mobile device, and including an excitation unit and a vibration unit, the excitation unit being disposed on a lateral side of the vibration unit, and the vibration unit being loosely fitted and disposed at the other end of the shaft; and
   a control module, disposed in the mobile device and at a position corresponding to the excitation unit;
   wherein when the control module is electrically conducted, the control module excites the excitation unit to produce a magnetic force to attach onto the shaft, and synchronously rotate with the shaft.

7. The mobile device of claim 6, further comprising a driving detection module, wherein when the driving detection module detects an electric conduction of the control module or the temperature inside the mobile device being greater than a predetermined value, the driving detection module generates a driving signal to drive the motor module.

8. The mobile device of claim 7, further comprising a power detection module, wherein when the power detection module detects that the electric power of the mobile device is smaller than a predetermined value, the power detection module generates a power signal to the driving detection module, and when the driving detection module receives the power signal, detects the electric conduction of the electric brush module, and detects the temperature inside the mobile device greater than the predetermined value, the driving detection module generates the driving signal to drive the motor module.

9. The mobile device of claim 6, wherein the heat dissipation module further comprises a casing disposed in the mobile device and at a position corresponding to the first function module for covering the first function module, and the casing has at least one opening formed on a lateral side of the casing.

10. The mobile device of claim 9, further comprising a sound-absorbing unit disposed on an internal surface or an external surface of the casing, and made of a material selected from the collection of glass wool, rock wool and a combination thereof.

11. The mobile device of claim 6, wherein the driving module is a motor module.

12. The mobile device of claim 6, wherein the shaft is a rotating shaft.

13. The mobile device of claim 6, wherein the first function module is a heat dissipation module.

14. The mobile device of claim 6, wherein the heat dissipation unit is a fan unit.

15. The mobile device of claim 6, wherein the second function module is a vibration module.

16. The mobile device of claim 6, wherein the excitation unit is an electromagnetic coil.

17. The mobile device of claim 6, wherein the vibration unit is a vibration cam.

18. The mobile device of claim 6, wherein the control module is an electric brush module.

* * * * *